(12) United States Patent
Borbone et al.

(10) Patent No.: US 8,722,316 B2
(45) Date of Patent: May 13, 2014

(54) PROCESS FOR REALIZATION OF POLYMERIC MATERIALS WITH SECOND ORDER NONLINEAR ELECTRO-OPTICAL PROPERTIES AND ELECTRO-OPTICAL DEVICES MADE WITH SAID MATERIAL

(75) Inventors: Fabio Borbone, Rome (IT); Antonio Roviello, Rome (IT); Roberto Centore, Rome (IT); Antonio Carella, Rome (IT); Fabio De Matteis, Rome (IT); Mauro Casalboni, Rome (IT); Glauco Stracci, Rome (IT); Massimiliano Dispenza, Rome (IT)

(73) Assignee: Selex Sistemi Integrati S.p.A, Rome (IT)

( * ) Notice: Subject to any disclaimer, the term of this patent is extended or adjusted under 35 U.S.C. 154(b) by 89 days.

(21) Appl. No.: 13/333,499

(22) Filed: Dec. 21, 2011

(65) Prior Publication Data

US 2012/0211463 A1    Aug. 23, 2012

(30) Foreign Application Priority Data

Dec. 23, 2010   (IT) .............................. RM2010A0687

(51) Int. Cl.
| | |
|---|---|
| *G02F 1/361* | (2006.01) |
| *C08G 18/10* | (2006.01) |
| *C08G 18/32* | (2006.01) |
| *C08G 18/76* | (2006.01) |

(52) U.S. Cl.
CPC ................ *G02F 1/361* (2013.01); *C08G 18/10* (2013.01); *C08G 18/32* (2013.01); *C08G 18/7657* (2013.01)
USPC ............. 430/321; 430/320; 427/532; 216/13; 528/59

(58) Field of Classification Search
None
See application file for complete search history.

(56) References Cited

U.S. PATENT DOCUMENTS

| | | | | |
|---|---|---|---|---|
| 5,163,060 A | * | 11/1992 | Mitra et al. | ...................... 372/21 |
| 5,318,729 A | * | 6/1994 | Kurihara et al. | ............... 252/582 |
| 5,616,678 A | * | 4/1997 | Beckmann et al. | ............. 528/73 |
| 6,001,958 A | * | 12/1999 | Tapolsky et al. | ............... 528/360 |

FOREIGN PATENT DOCUMENTS

| | | | |
|---|---|---|---|
| EP | 350112 | * | 6/1989 |
| EP | 648792 | * | 10/1994 |

OTHER PUBLICATIONS

Zhang et al., "Electric poling and relaxation of thermoset polyurethane second order nonlinear . . . ". Macromol. vol. 24(2) pp. 235-243 (2001).*

(Continued)

*Primary Examiner* — Martin Angebranndt
(74) *Attorney, Agent, or Firm* — Hedman & Costigan, P.C.; James V. Costigan; Kathleen A. Costigan

(57) ABSTRACT

The present invention concerns a process for realization of polymeric materials with second order nonlinear electro-optical properties comprising the following steps:
mixing of a chromophore with nonlinear optical properties with two or three hydroxy groups;
isolation of said pure bi- or tri-isocyanate NLO chromophores obtained according to the above step;
dissolution of said bi- or tri-isocyanate NLO chromophores obtained according to the above step in one or more isocyanate group not reactive solvents containing reactive substances;
coating of a thin layer of said prepolymer mixture on a substrate and evaporation of said not reactive solvents;
cross-linking and poling of said thin layer on substrate, by means of heating and application of an electric field;
cooling of said thin cross-linked and poled layer at ambient temperature maintaining the applied poling electric field;
switching off the poling electric field.

8 Claims, 14 Drawing Sheets

(56) References Cited

OTHER PUBLICATIONS

Figure 1:
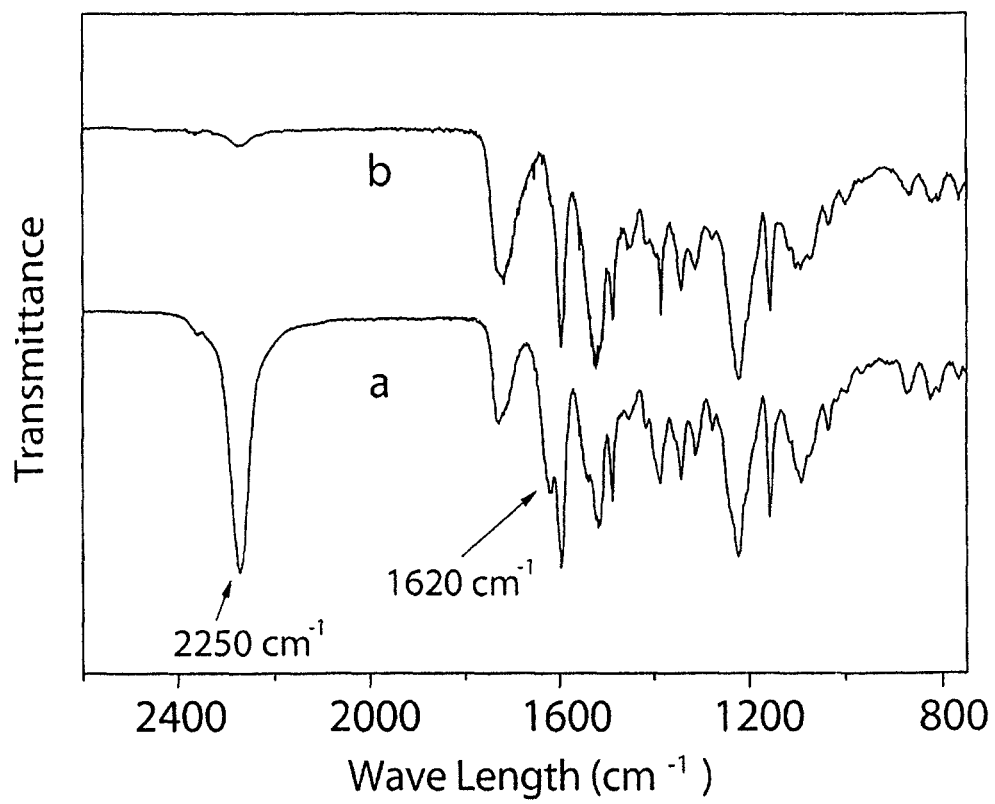

Steier et al., "nonlinear optics and optical micropatterning in polymers with disperse red 19 sidegroups". Proc. SPIE vol. 1775 pp. 379-390 (1992).*

Wang et al., "Syntheses of second order nonlinear optical polyurethanes for electrooptic etalons", Chem. Mater., vol. 7(1) pp. 185-191 (1995).*

Borbone, F., "Materiali polimerici per applicazioni in ottica non lineare del secondo ordine: sintesti, structtura e proprieta", Thesis University of Napoli, 148 pages (2007).*

Francis, et al., "Isocyanate crossliked polymers for nonlinear opticls. 2. polymers derived from . . . ", Ind. Eng. Chem. Res., vol. 38(1) pp. 2-7 (1999).*

Shi et al., "anchoring both ends of the chromophor in the sidechain nonlinear optical polymer . . . "., Proc. SPIE vol. 2025 pp. 106-116 (1993).*

Matsui et al., "side reactions of phenylisocyanate in N,N-dimethylacetamide", J Appl. Poly. Sci., vol. 42 pp. 2443-2452 (1991).*

Chen, et al., "New polymers with large and stable second order nonlinear optical effects". Macrolmol. vol. 24(19) pp. 5421-5428 (1991).*

Herman et al.; Maker fringes revisited: second-harmonic generation from birefringement or absorbing materials; J. Opt. Soc. Am. B/vol. 12, No. 3, 416-427 (1995).

Matsui et al; Side Reactions of Phenylisocyanate in N,N-Dimethylacetamide; J. Applied Poly Sci, vol. 42, 2443-2452 (1991).

Herman et al.; Maker fringes revisited: second-harmonic generation from birefringement or absorbing materials; J. Opt. Soc. Am. B/vol. 12, No. 3, 416-427 (1995).

Kleinman; Nonlinear Dielectric Polarization in Optical Media; Physical Review, vol. 126, No. 6, 1927-1979(1962).

* cited by examiner

DMNCO3

PROCESS FOR REALIZATION OF POLYMERIC MATERIALS WITH SECOND ORDER NONLINEAR ELECTRO-OPTICAL PROPERTIES AND ELECTRO-OPTICAL DEVICES MADE WITH SAID MATERIAL

The present invention concerns a process for realization of polymeric materials with second order nonlinear electro-optical properties and electro-optical devices made with said material.

As it is well known, organic and polymeric materials for second order nonlinear optics (NLO) have been the object of intense research during last twenty years being considered a valid alternative to the conventional organic crystalline materials for applications in opto-electronic devices (D. M. Burland, R. D. Miller, C. A. Walsh; Chem. Rev., 1994, 94, 31; b) Gebremichael, M. G. Kuzyk, H. S. Lackritz; Prog. Polym. Sci. 1997, 22, 1147; c) J. J. Wolff, R. Wortmann; Organic Materials for Second-Order Non-Linear Optics, In Advances in Physical Organic Chemistry, 1999, 32, 120; d) L. Dalton, Advanced in Polymer Science, 2002, 158, 1; e) L. R. Dalton, Pure and Applied Chemistry 2004, 76, 1421). In fact, NLO organic materials offer, when compared to traditional inorganic ones, some interesting characteristics as: low dielectric constants (allowing bandwidths of the order THz to be obtained in devices), higher theoretical activities, low production cost and the possibility, using synthetic approaches, the material properties to be modulated according to desired requirements for a specific application.

Second order NLO materials generally are based on NLO chromophores inserted in polymeric matrix and oriented by means of electrical poling in a preferred direction, in order to obtain a not centro-symmetrical disposition, condition required so that the material can display second order nonlinear properties. NLO chromophore is typically a molecule with structure consisting of a conjugated π system bearing, at the extremities, electron donating and electron withdrawing groups as below reported, thus conferring high value molecular hyper-polarizability coefficients and therefore high nonlinear molecular optical response.

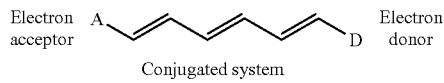

During the last years, as a result of intense synthetic research, chromophores with exceptionally high molecular hyper-polarizability values have been obtained (A. K.-Y. Jen, Y. Cai, P. D. Bedworth, S. R. Marder, Adv. Materials, 1997, 9, 132; J. M. Raimundo, P. Blanchard, I. Ledoux Rak, R. Hierle, L. Michaux, J. Roncali, Chem. Comm., 2000, 1597). At the same time, a careful analysis of the poling process allowed the molecular nonlinear activity at material macrocospic level to be transferred at the best: particularly, intense theoretical and experimental works confirmed that one of the most important factors limiting the efficiency of the poling process are centrosymmetrical interactions among dipolar NLO chromophores and that the latter can be reduced by chromophore structure modification (L. R. Dalton, A. W. Harper, B. H. Robinson, PNAS, 1997, 94, 4842) or isolating the same inside of a polymer matrix, as for example according to dendritic approach (P. A. Sullivan, H. Rommell, Y. Liao, B. C. Olbricht, A. J. P. Akelaitis, K. A. Firestone, J.-W. Kang, J. Luo, J. A. Davies, D. H. Choi, B. E. Eichinger, P. J. Reid, A. Chen, A. K.-Y. Jen, B. H. Robinson, L. R. Dalton, J. Am. Chem. Soc., 2007, 129, 7523). According to these guidelines material with values of $r_{33}$ electro-optical coefficients higher 100 pm/V, i.e. far greater than 30 μm/V typical value for lithium niobate ((a) J.-W. Kang, T.-D. Kim, J. Luo, M. Haller, Appl. Phys. Letters, 2005, 87, 071109; (b) T.-D. Kim, J.-W. Kang, J. Luo, S.-H. Jang, J.-W. Ka, N. Tucker, J. B. Benedict, L. R. Dalton, T. Gray, R. M. Overney, D. H. Park, W. N. Herman, A. K.-Y. Jen, J. Am. Chem. Soc., 2007, 129, 488) and devices with hundred GHz modulation band width, operating with digital device typical voltage ((a) Y. Shi, C. Zhang, H. Zhang, J. H. Bechtel, L. R. Dalton, B. H. Robinson, W. H. Steier, Science 2000, 288, 119; (b) M. Lee, H. E. Katz, C. Erben, D. M. Gill, P. Gopalan, J. D. Heber, D. J. McGee, Science 2002, 298, 1401; (c) S. R. Marder, B. Kippelen, A. K.-Y. Jen, N. Peyghambarian, Nature (London) 1997, 388, 845; (d) T. J. Marks, M. A. Ratner, Angew. Chem., Int. Ed. Engl. 1995, 34, 155; (e) F. Kajzar, K.-S. Lee, A. K.-Y. Jen, Adv. Polym. Sci. 2003, 161, 1) have been obtained.

Although up to now excellent activities have been reached, the rapid development of organic electro-optical devices is hampered by temporal stability of such not still excellent activities: differently than conventional inorganic materials, in fact, organic systems suffer from an activity loss over the time, due to the relaxation of poling obtained molecular orientation. In order to address this problem, various approaches have been explored, like for example the preparation of polymeric systems with high glass transition temperature $(T_g)$ containing like host molecules or covalently bound NLO chromophores ((a) J. Luo, M. Haller, H. Li, H.-Z. Thang, A. K.-Y. Jen, K. Jakka, C.-H. Chou, C.-F. Shu, Macromolecules, 2004, 37, 248; (b) T. Verbiest, D. M. Burland, M. C. Jurich, V. Y. Lee, R. D. Miller, W. Volksen, Science; 1995, 268, 1604; (c) H. Saadeh, D. Yu, L. M. Wang, L. P. Yu, J. Mater. Chem. 1999, 9, 1865; (d) T. A. Chen, A. K.-Y. Jen, Y. M. Cai, J. Am. Chem. Soc. 1995, 117, 7295; (e) M. H. Davey, V. Y. Lee, L.-M. Wu, C. R. Moylan, W. Volksen, A. Knoesen, R. D. Miller, T. J. Marks, Chem. Mater. 2000, 12, 1679). The main problem for this type of systems is the need the chromophores to be oriented at very high temperatures (because the poling temperature must be as close as possible to polymer $T_g$) possibly resulting in thermal degradation of chromophores. Further polymers having cross-linking activity suitable for the cross-linking of the material after the poling process, in order to hinder in an effective way chromophore mis-orientation, have been studied (M. Haller, J. Luo, H. Li, T.-D. Kim, B. H. Robinson, A. K.-Y. Jen, Macromolecules, 2004, 37, 688; T. D. Kim, j. Luo, J.-W. Ka, S. Hau, Y. Tian, Z. Shi, N. M. Tucker, S.-H. Jang, J.-W. Kang, A. K.-Y. Jen, Adv. Mater., 2006, 18, 3038). Based on this idea, chromophores with cross-linking activity and having a low tendency to crystallize have been synthesised, aiming amorphous films to be obtained: such films have been poled and cross-linked in order to have stable NLO materials ((a) J. A. F. Boogers, P. Th. A. Klaase, J. J. De Vlieger, D. P. W. Alkema, A. H. A. Tinnemans, Macromolecules, 1994, 27, 197; (b) J. A. F. Boogers, P. Th. A. Klaase, J. J. De Vlieger, A. H. A. Tinnemans, Macromolecules, 1994, 27, 205; (c) H. Ma, B. Chen, T. Sassa, L. R. Dalton, A. K.-Y. Jen, J. Am. Chem. Soc., 2001, 123, 986; (d) A. Carella, R. Centore, L. Mager, A. Barsella, A. Fort, Organic electronics, 2007, 8, 57). Using this type of approach, in principle, it is possible to obtain material with high degree of molecular orientation, since the chromophores are oriented if are not yet bound to a macromolecular system and at the same time with high temporal stability as obtained due to the cross-linking. Up to now, activity stabilities higher than 90% to 85° C. have been obtained. In order an effective commercialization of organic devices to be possible, however, said stability must be further improved.

In this context the solution according to the present invention is disclosed, the object thereof being to provide for bi- and tri-functionalized chromophores that can be cross-linked and at the same time or successively poled thus obtaining materials with NLO activity comparable to lithium niobate and with remarkable temporal stability.

Therefore it is the object of the present invention to provide for a material with electro-optical properties allowing the limits of materials according to known technology to be exceeded and previously described technical results to be reached.

A further object of the invention is that said material can be obtained at substantially low costs, both as to production and operation costs.

Not last object of the invention is the production of a material substantially simple to be obtained and safe and reliable to be used.

It is therefore a first specific object of the present invention a process for the realization of polymeric materials with second order nonlinear electro-optical properties comprising the following steps:

mixing of a chromophore with nonlinear optical properties with two or three hydroxy groups in an isocyanate not reactive solvent containing an isocyanate compound with at least two isocianate groups (the reaction of one of said two isocianate groups with chromophore hydroxy group generating an urethane group acting as a bridge between chromophore and isocyanate compound. Therefore at the end of this reaction the result is the anchoring to the chromophore of two or three pendants everyone bearing an isocyanate and an urethane bridge with chromophore), in order one or more bi- or tri-isocyanate NLO chromophores to be obtained;

isolation of said pure bi- or tri-isocyanate NLO chromophores obtained according to the above step;

dissolution of said pure bi- or tri-isocyanate NLO chromophores obtained according to the above step in one or more isocyanate group not reactive solvents containing reactive substances consisting of acyl-substituted or unsubstituted formamides and/or acylamides bearing as nitrogen substituents, independently, one or more hydrogen atoms, one or more alkyls substituted or unsubstituted with isocyanate moiety not reactive groups, one or more phenyl groups substituted or unsubstituted with isocyanate moiety not reactive groups, in order to obtain a prepolymer mixture consisting of said not reactive solvents and reaction products of said NLO bi- or tri-isocyanate chromophores and said reactive substances;

coating of a thin layer of said prepolymer mixture on a substrate and evaporation of said not reactive solvents;

cross-linking and poling of said thin layer on substrate, by means of heating and application of an electric field, in order a cross-linked and poled thin layer to be obtained;

cooling of said thin cross-linked and poled layer at ambient temperature maintaining the applied poling electric field;

switching off the poling electric field.

Moreover, according to the present invention, said step of cross-linking and poling of said thin layer coated on the substrate can consist of:

pre-heating of thin layer coated on the substrate at a temperature from 100 to 180° C. over a time up to 30 minutes and successive application of an electrode voltage from 3 to 20 kV for at least one hour.

Preferably, said pre-heating is carried at a temperature from 160 to 180° C., with an heating ramp of 50-80° C./min, and said voltage is from 7.5 to 11 kV for a time period up two hours.

Preferably, according to the present invention, said reactive substances consist of N,N-dimethylacetamide (DMAC).

Moreover, according to the invention, said step for coating of a mixture thin layer on a substrate is carried out by means of spin coating, said cooling step with applied poling field occurs with a cooling ramp of 2÷4° C./sec under direct $N_2$ flow.

It is further a second specific object of the present invention a process for the realization of an electro-optical device by definition of optical paths and driving electrodes in a polymeric material with second order nonlinear properties, comprising, following the steps of realization of said polymeric material with second order nonlinear electro-optical properties as previously defined, a step set of photolithographic definition and ionic erosion of said polymeric material, after a step for coating of a protecting buffer layer on said polymeric material layer, so as to maintain constantly embedded said layer of polymeric material in the areas involved in optical path realization during all the successive photolithographic definition and ionic erosion steps.

Particularly, according to the invention, said process for the realization of an electro-optical device as above defined, comprises the following steps:

coating, cross-linking, poling of a polymeric material layer with second order non linear electro-optical properties, using above said process steps;

coating of a protective buffer layer consisting of silicon dioxide or other dielectric material resistant to required chemical etchings for the definition of an etching mask, according to the following steps:

coating of an etching mask with suitable pattern, preferably of metallic nature) resistant to ionic etching according to the following step;

removal by ionic etching of protective buffer layer, only in etching mask free areas;

partial or total removal of polymeric material layer with second order nonlinear electro-optical properties only in etching mask free areas.

Figure 2:
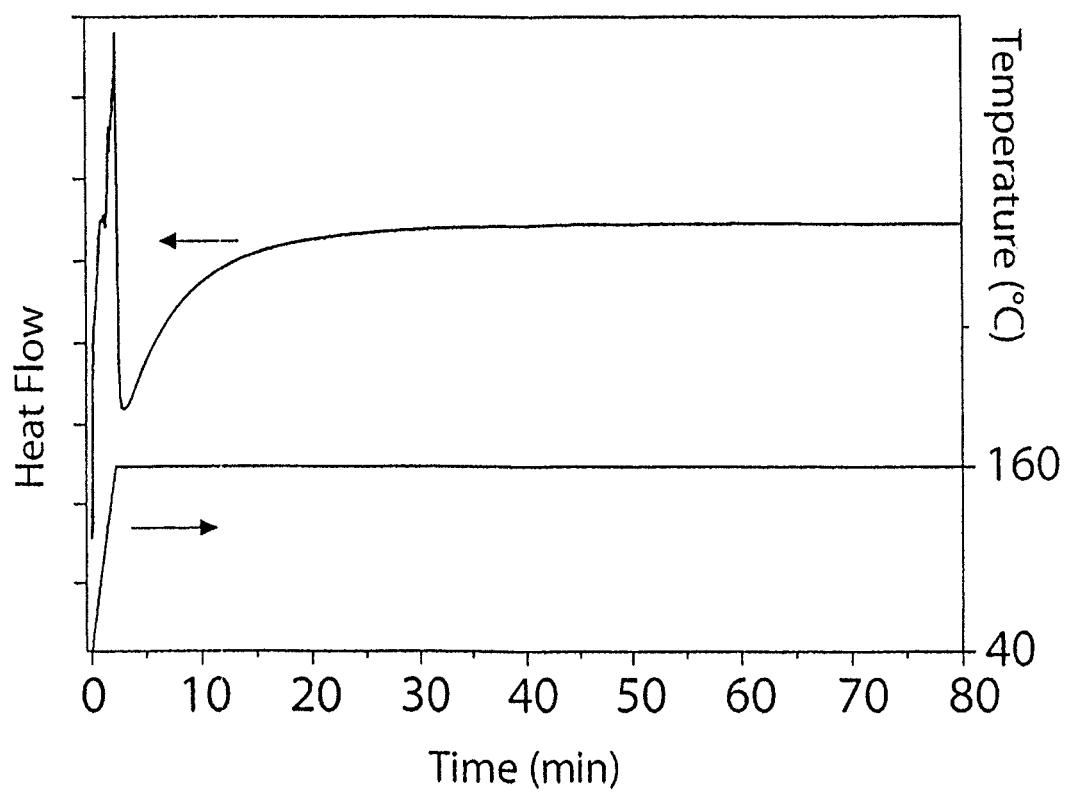
Figure 3:
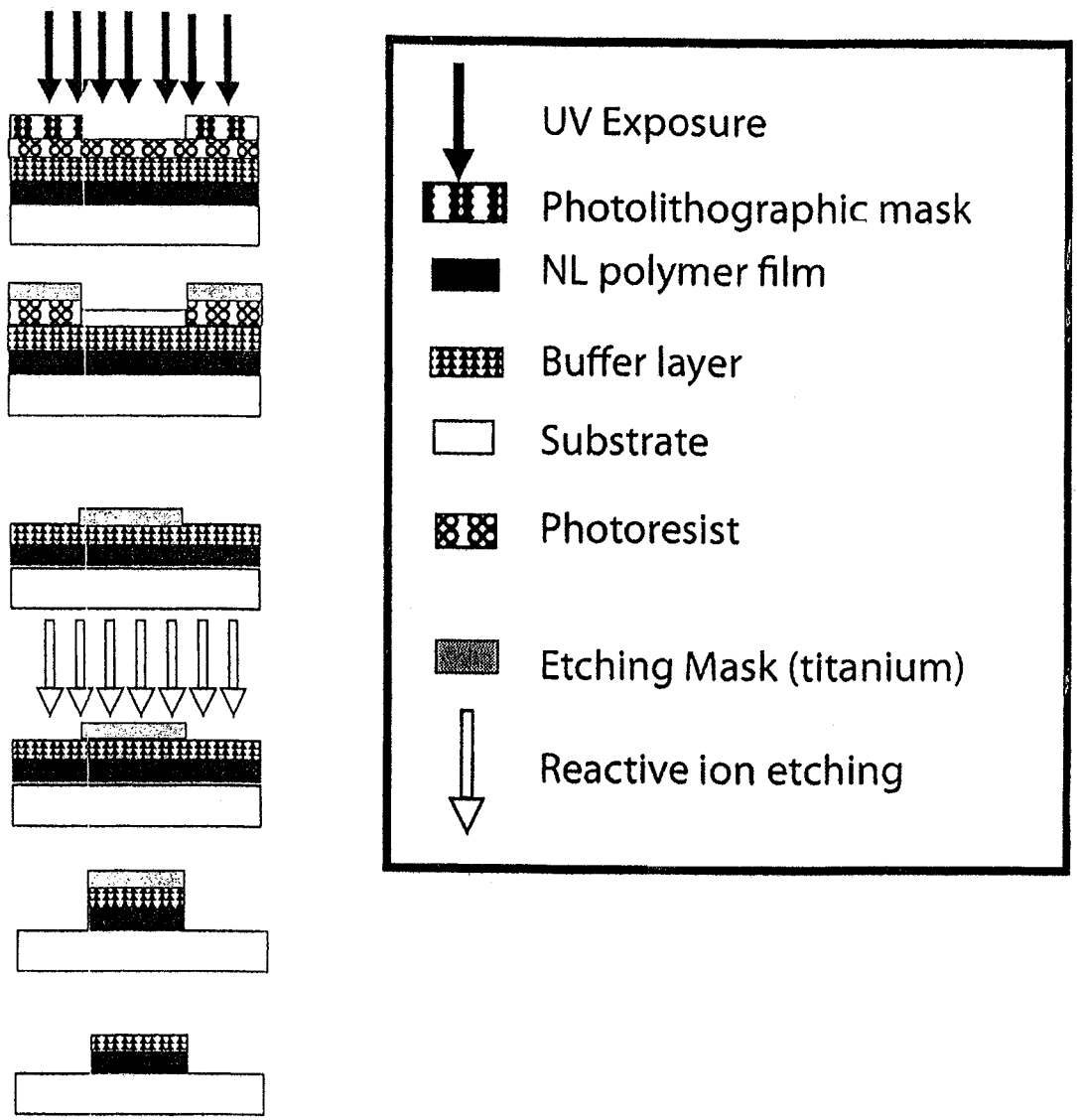
Figures 4, 5:
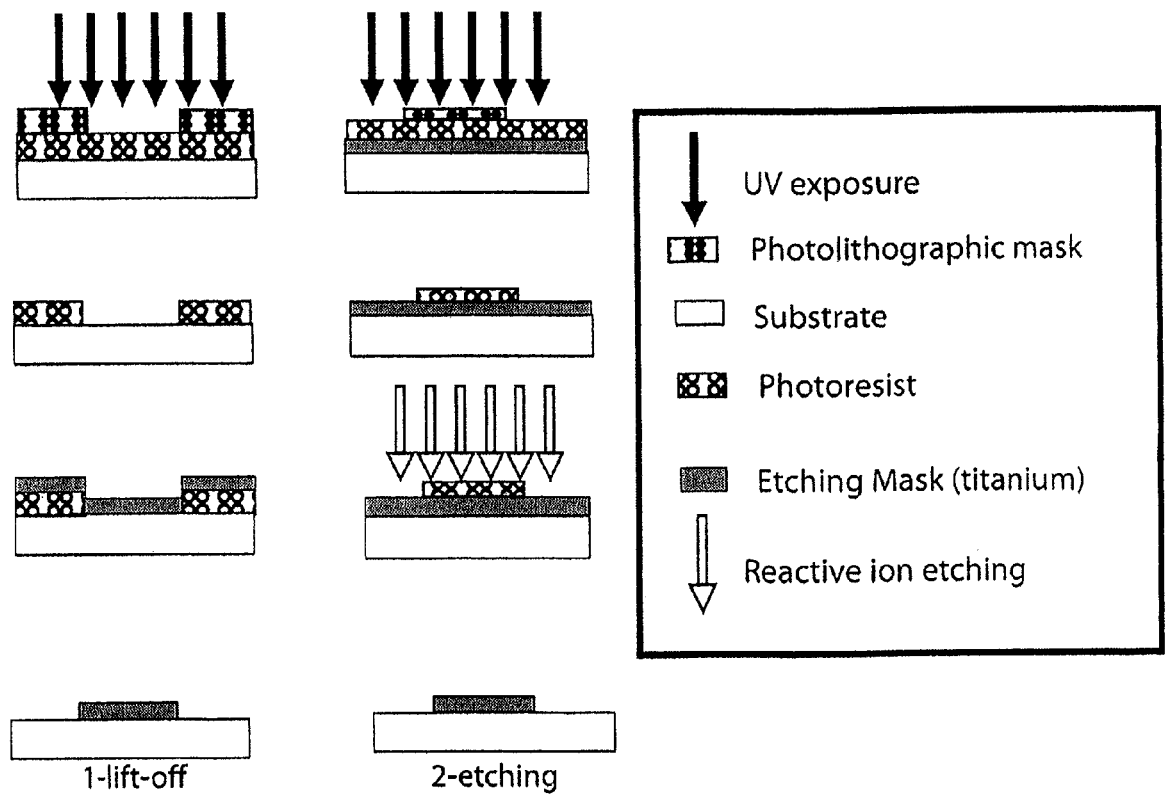
Figure 6:
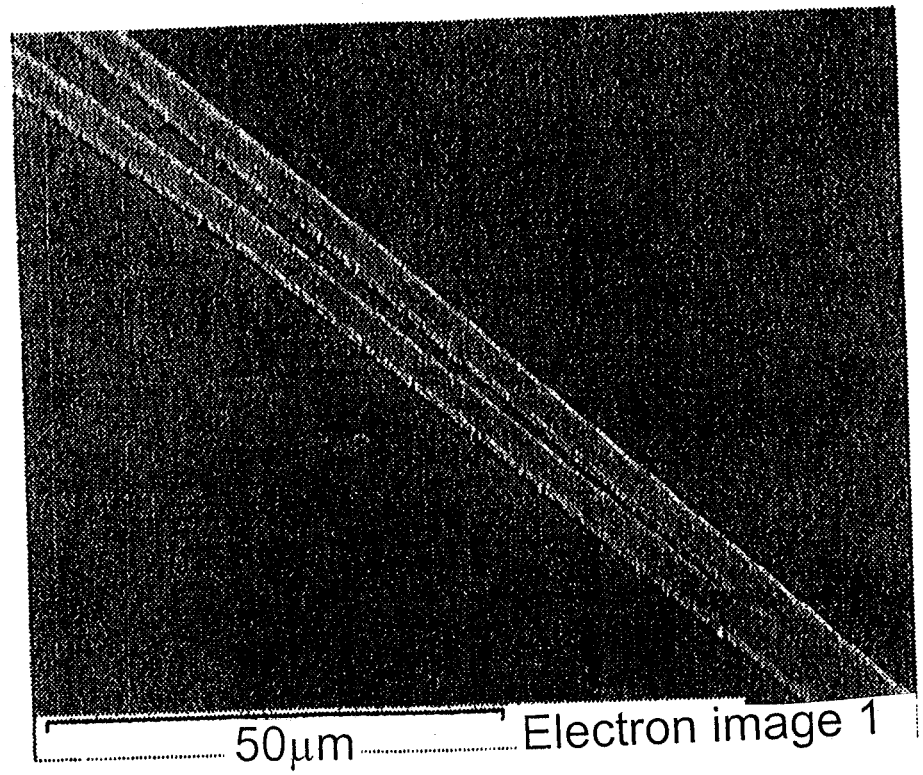
Figure 7:
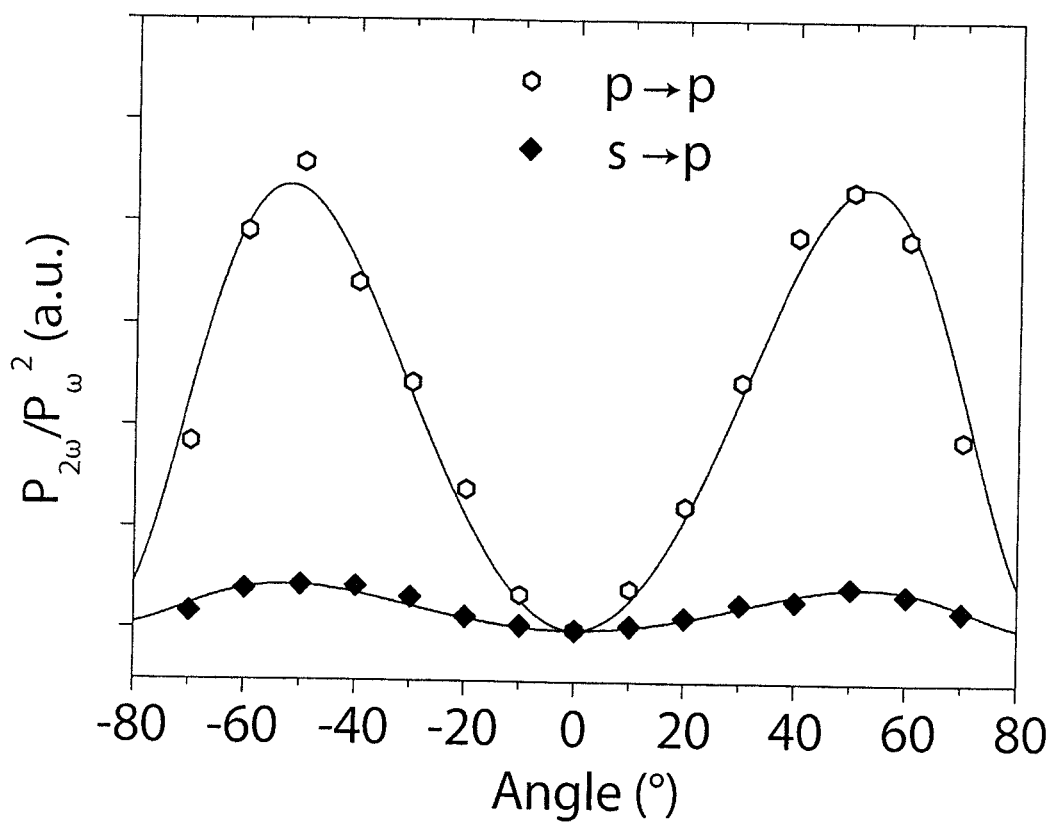
Figure 8:
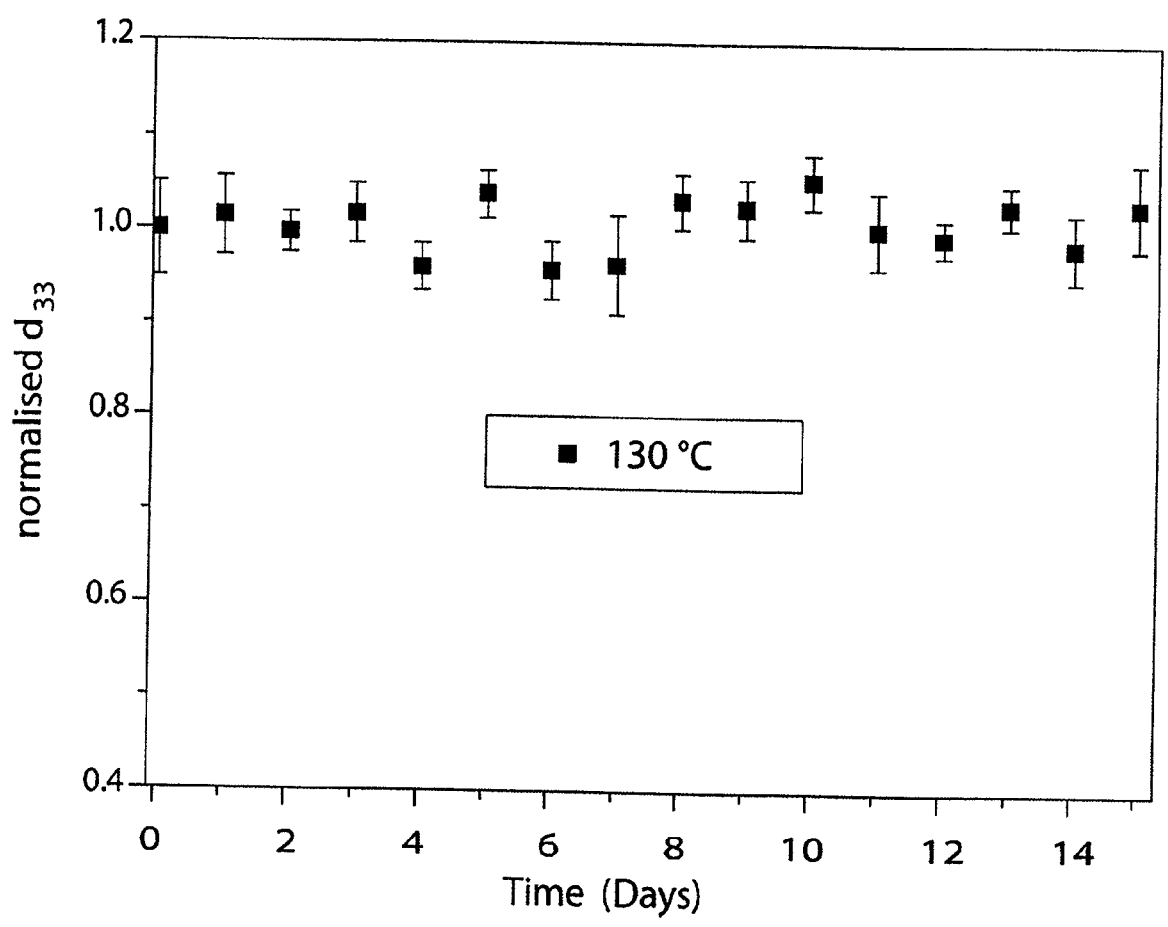
Figure 9A:
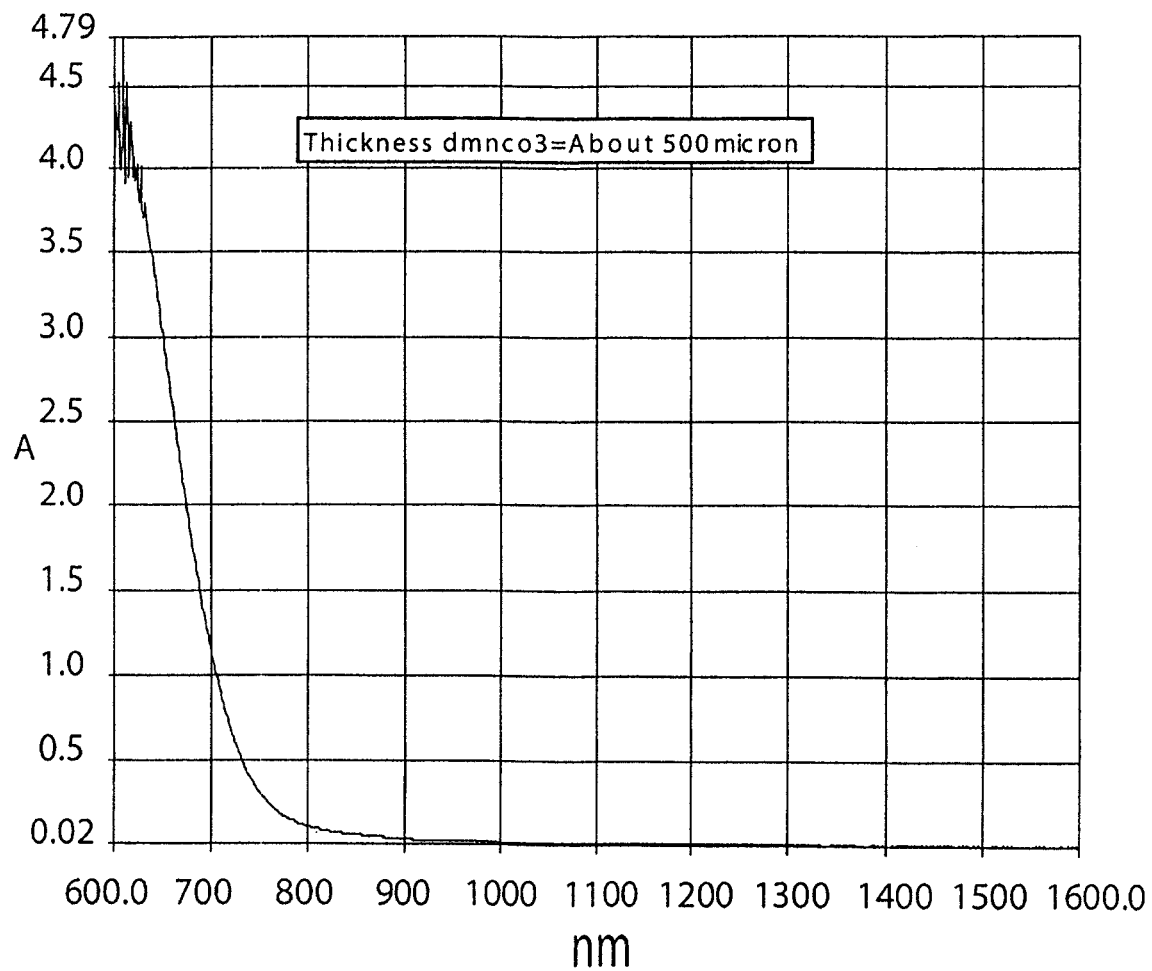
Figure 9B:
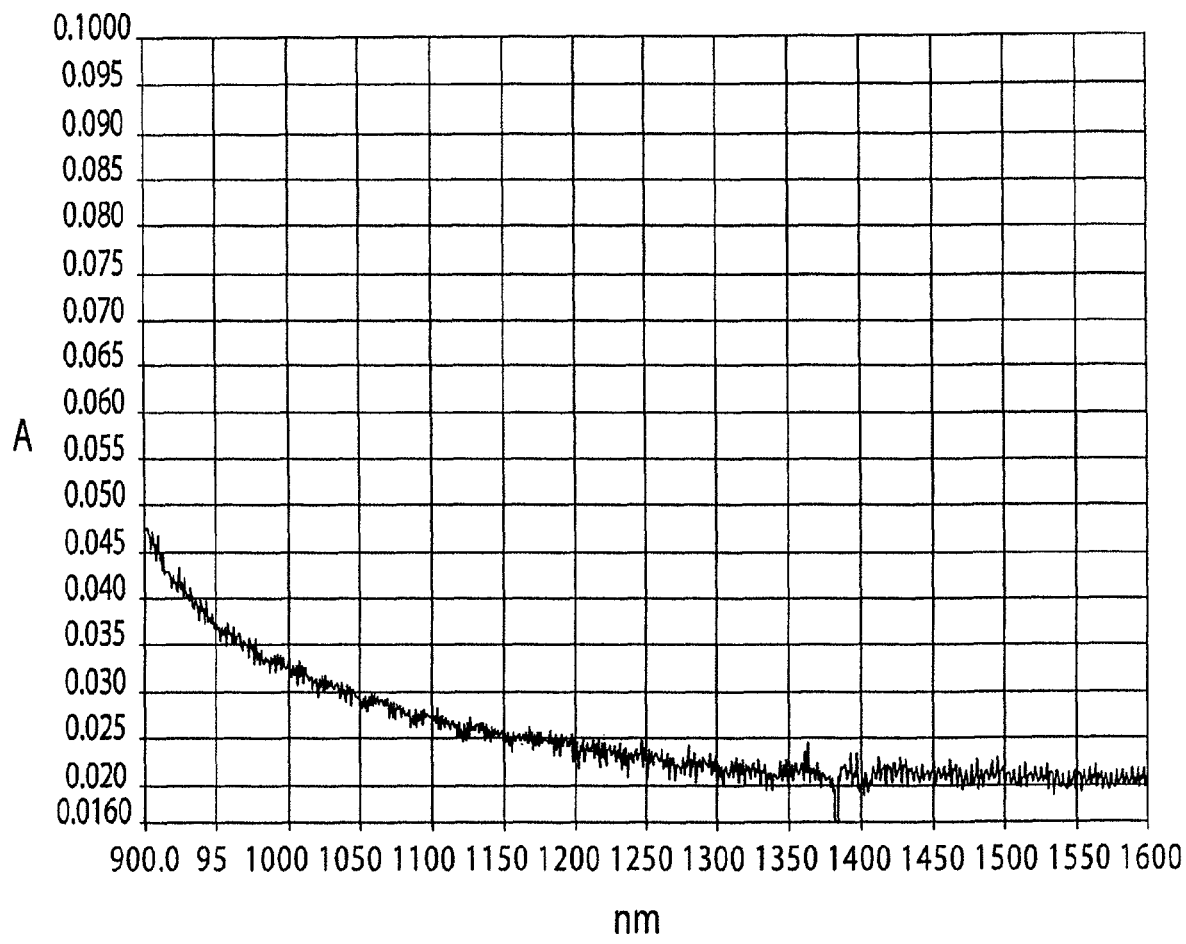
Figure 10A:
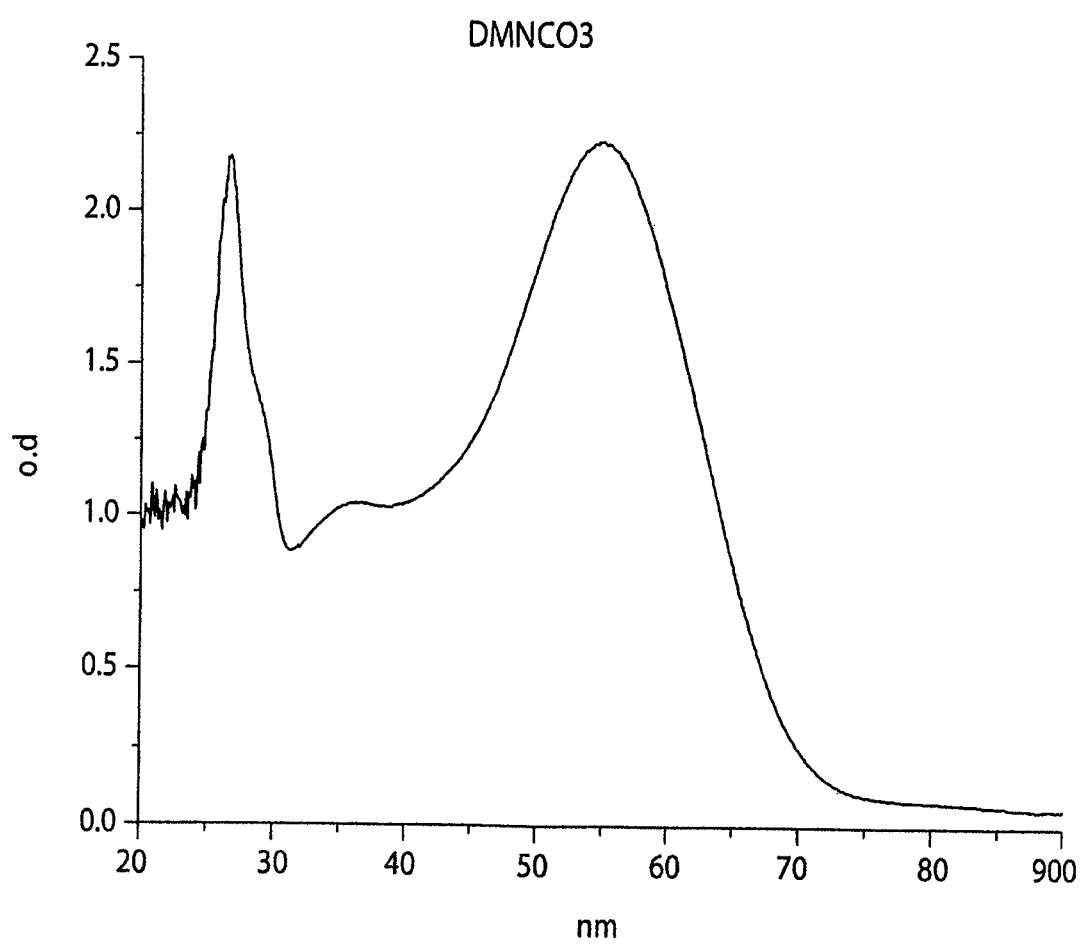
Figure 10B:
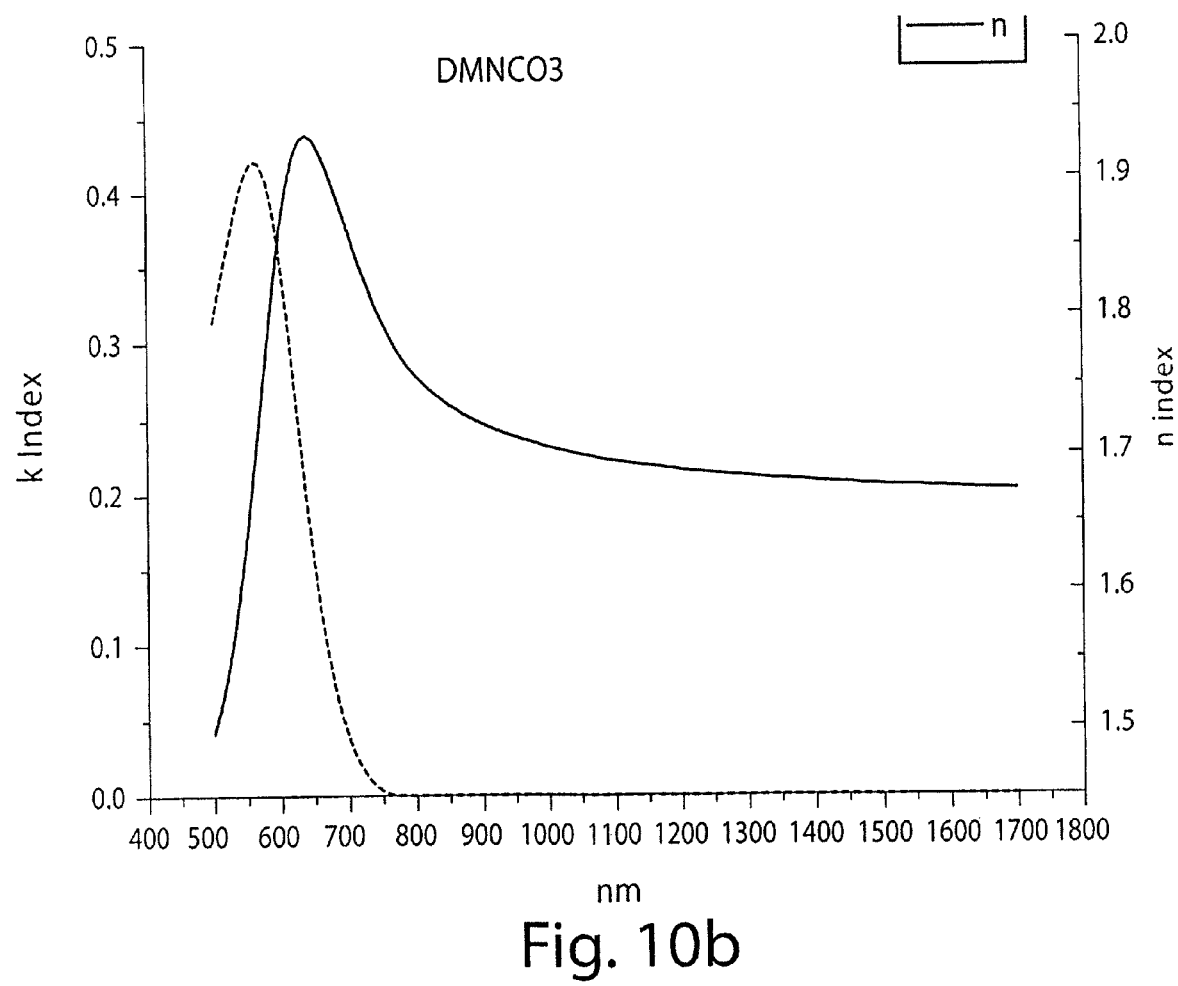
Figure 11:
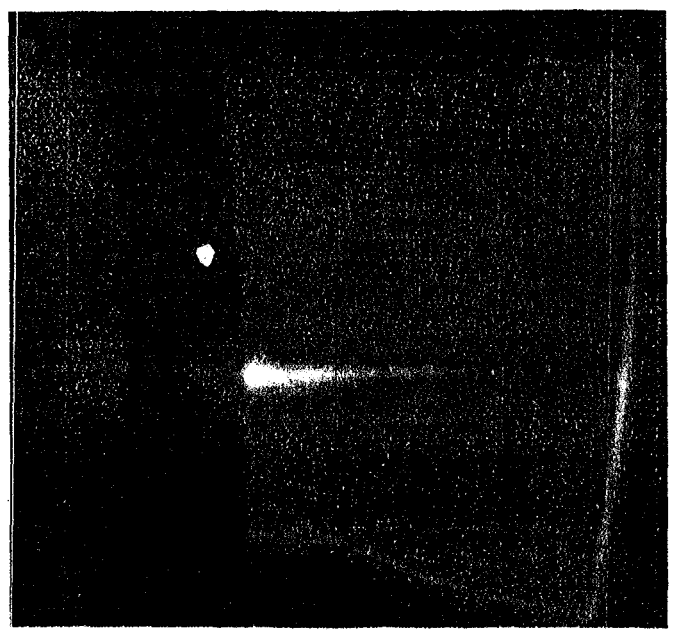
Figure 12:
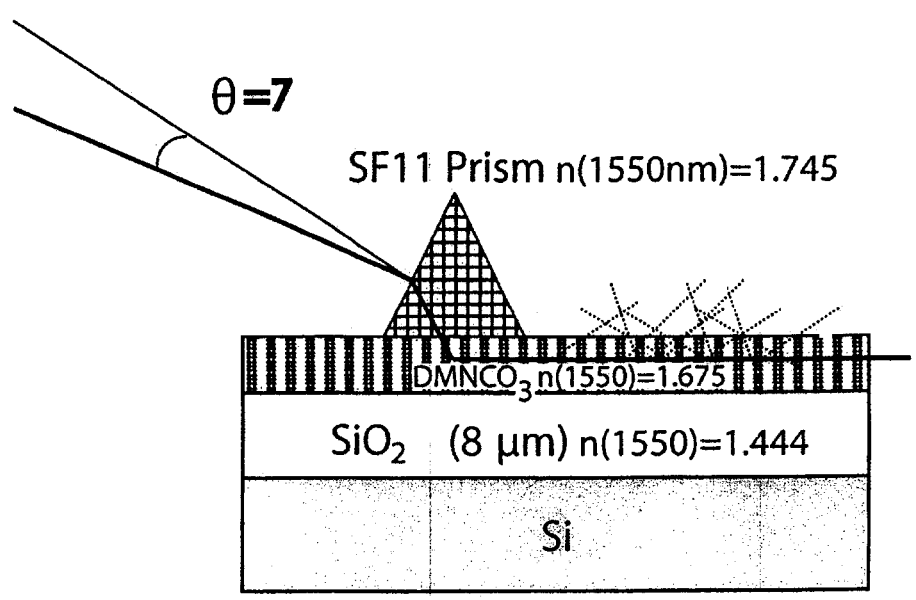
Figure 13:
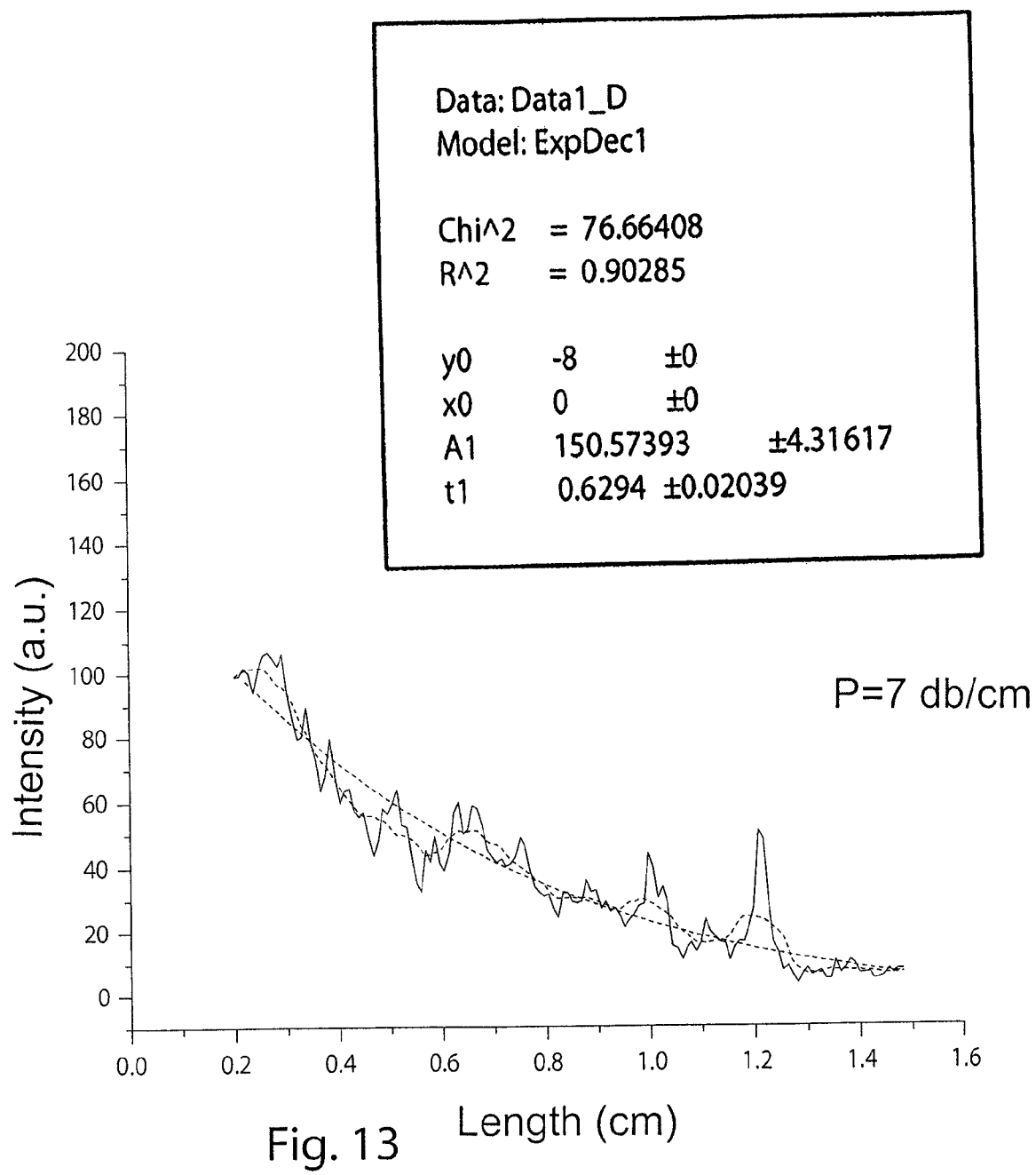

The invention now will be described by an illustrative, but not limitative way with particular reference to some embodiments and figures of attached drawings, wherein:

FIG. 1 shows results of a FT-IR analysis for a film according to the present invention, FIG. 2 shows DSC time dependent curve during a poling and cross-linking step according to the present invention, FIG. 3 schematically shows the realization steps of optical guides according to the present invention, FIG. 4 schematically shows the realization steps of optical guides according to previous known lift-off technology, FIG. 5 schematically shows the realization steps of optical guides according to previous known etching technology, FIG. 6 shows image obtained using electronic scanning microscope of an optical ridge guide obtained according to the process of the present invention, FIG. 7 shows Maker fringes for $DMNCO_3$ of example 6, FIG. 8 shows the stability over the time of NLO properties during the heat treatment at a temperature of 130° C. of a poled sample from example 5, FIG. 9a shows absorption spectra obtained from analysis carried out on 500 μm thick, casting coated sample according to example 7, FIG. 9b shows absorption spectra obtained from the analysis carried out on 500 μm thick, casting coated sample according to example 7, in the range from 900 to 1600 nm, the FIG. 10a shows a representative diagram of results of spectrophotometric measures in visible absorption range carried out on 500 μm thick, casting coated sample according to example 7, the FIG. 10b shows a representative diagram of the result of ellipsometric measures carried out on 500 μm thick, casting coated sample according to example 7, FIG. 11 shows an infrared camera acquired image relating to infrared laser excitation and guided way propagation in a flat film of example 8, FIG. 12 shows the measure diagram of scattering losses of example 8, and FIG. 13 shows a diagram of loss value as described according to an exponential function of example 8.

The present invention is directed to provide bi- and tri-functionalized NLO poled chromophores suitable to be cross-linked resulting in materials with NLO activities comparable to lithium niobate and with remarkable temporal stability.

In order the cross-linkable system to be obtained the chromophores are opportunely functionalized with isocyanate groups. It is known that this type of functionalization is widely used in industrial and scientific field for the production of polyurethanes designed for multiple uses and applications. In general terms, this type of polymers is obtained by reaction of diisocyanates e hydroxylated monomers, and analogously cross-linked polyurethanes can be obtained by reaction of poly-isocyanates and polyols. Approaches of this kind already have been exploited previously for opto-electronic materials wherein mixtures of tri-isocyanate chromophores, poly-hydroxylated molecules and diisocyanates have been thermally cross-linked during an electrical poling process (J. A. F. Boogers, P. Th. A. Klaase, J. J. de Vlieger, and A. H. A. Tinnemans, Macromolecules 1994, 27, 205-209). However, thus obtained materials displayed not excellent performances, particularly in terms of stability. This method, applied for stoichiometric mixtures of tri-hydroxylated chromophores and tri-isocyanates as below reported, proved to be poorly compatible with the coating/poling/cross-linking procedure of the material, because the cross-linking rate resulted poorly controllable under operating conditions and generally too much fast to allow the chromophore to be orientated by the successive poling operation before the blocking or "gelation" thereof by cross-linking reaction.

Instead, according to the present invention, it is proposed a process using exclusively bi- or triisocyanate chromophores and interestingly characterized in that said process is completely general and applicable to various NLO chromophores, resulting in materials with very stable activity.

In the following structures of some synthesised chromophores are reported:

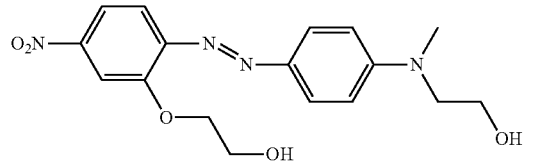
(I)

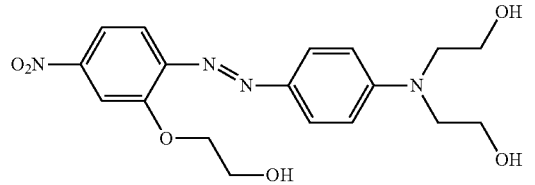
(II)

(III)

These and other similar molecules can be easily functionalized by reaction with asymmetric diisocyanates, resulting in triisocyanate isomers, like as for example below reported structure (IV) (obtained by functionalization of chromophore (III)), not crystallizable, that can be precipitated and directly used for film coating without further reactions.

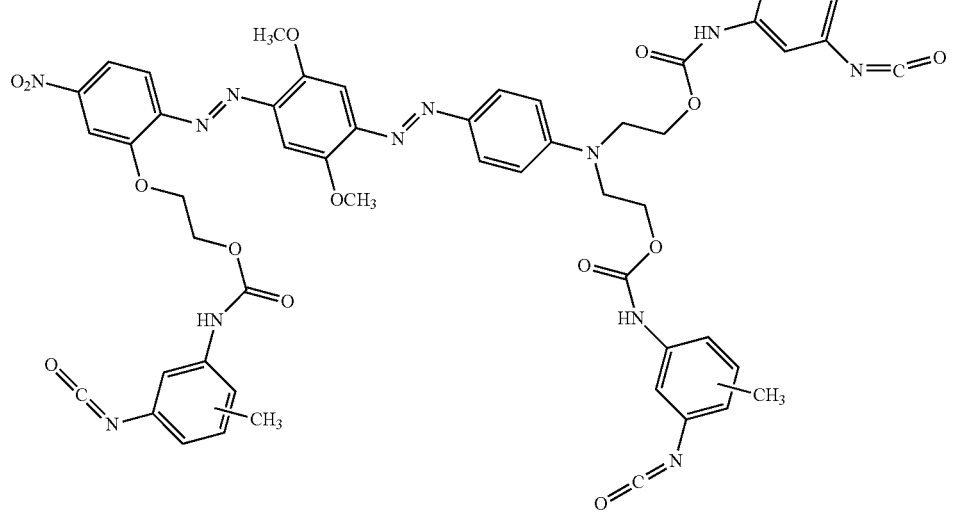
(IV)

The cross-linking of these films occurs by heating resulting from reactions involving isocyanate and/or urethane groups occurring within the molecules. This system is quite different than analogous literature reported examples, wherein cross-linked materials are again obtained by reaction of isocyanate and epoxy or hydroxyl moieties.

Solutions of triisocyanate compounds in chloroform, THF, dioxane or dichloromethane, are easy coatable by spin coating. An heat treatment at 160° C. for approximately two hours is sufficient to cross-link the material resulting in insolubility thereof in strong solvents as, for example, N,N-dimethylformamide.

According to this process, however, stability problems arise during poling process, resulting in sample corrosion few minutes after poling voltage application and temperature increase. This behaviour very probably is related to the insufficient consistency of not previously polymerized material, that therefore is too sensitive to ionized gas flow generated by corona effect. According to the literature, the dissolution in poorly polar solvents at room temperature does not result in reactions between isocyanate and urethane groups, therefore it can be assumed reasonably that the deposited material consists only of starting molecules. This drawback is related to excessively low polymerization reaction rate, resulting in need of poling electric field application over sufficiently long times such that the corrosion damages resulting from poling are apparent.

The erosion problem is resolved by inducing a pre-polymerization of material resulting in a suitable hardening thereof, that is an heat treatment at 170° C. for 1.5 hours before the electrical field application. This behaviour is consistent with observations by Lapprand et al. (A. Lapprand, F. Boisson, F. Delolme, F. Mechin, J.-P. Pascault Polymer Degradation and Stability 2005, 90, 363-373), which demonstrated that isocyanate and urethane moieties react slowly only at high temperatures, resulting above all in allophanates. However, when said samples are subjected to this treatment, the resulting chromophore orientation is insufficient and therefore a low nonlinear and less stable over the time response is observed, probably due to the relative instability of the allophane lattice. In this case, in fact, the polymerization reaction, as opposed to previous one, has too much proceeded due to heating, resulting in "a partially freezing" of chromophore orientation already during such heating, when the same is totally accidental as no poling field has been yet applied resulting in preferential direction.

Cross-Linking Methodology

The best approach in order to avoid the thermal pre-treatment and increase NLO stability and response is to use isocyanate reactive compounds, as for example N,N-dimethylacetamide (DMAC). It is known that DMAC reacts with isocyanate resulting in N,N-dimethylacetamidine, that further reacts resulting in the formation of carbamides and cyclic products like isocyanurates, substituted barbituric acids and aminouracyls ((a) Dyer E., Majewski T. E., Nycz T. J., Travis J. D. J. Heterocycl. Chem. 1972, 9, 955; (b) T. Matsui, H. Kamatani, Y. Arimatsu, A. Kaji, K. Hattori, H. Suzuki Journal of Applied Polymer Science 1991, 42(9), 2443-2452). Some of these reactions occur also at room temp. at significant rate, due to the catalytic activity of same DMAC. In fact, after few hours an apparent cross-linking and precipitation of triisocyanate compound from DMAC solution is observed. Analogous behaviour is observed using analogous DMAC derivatives. In general terms, the formulation according to the present invention involves the use of a generic substituted or unsubstituted formamide or acylamide and having as substituents on nitrogen independently one or more hydrogen atoms, one or more substituted or unsubstituted alkyls, one or more substituted or unsubstituted phenyls. In some cases, the compound is coatable in form of film, both from solutions of various solvents containing some amount of acylamide and from acylamide alone solutions. Where acylamide is solid or with too high boiling point, it is necessary the use thereof in stoichiometric amounts and with sufficiently low volatile solvents for the coating by spin coating. The use of DMAC, such it is or diluted with other solvents, is preferred due to the optimal balance of physical, catalytic and reactivity properties required in order an electro-optical as active and stable as possible and with good optical properties to be obtained. The film obtained by spin coating can be cross-linked at temperatures from 100 to 200° C., preferably 160° C., for at least 1 hour, preferably 2 hours.

With reference to FIG. 1, FT-IR analysis of film before (a) and after (b) the heat treatment shows strong decrease of isocyanate group peak (2250 cm$^{-1}$). Another apparent effect is the disappearance of absorption at 1620 cm$^{-1}$. This peak can be assigned to C=N/C=C stretching from acetamidine resulting from reaction between DMAC and isocyanate functions during early steps at room temperature.

However, various other reactions can occur between isocyanate moieties wherein DMAC acts simply like reagent or catalyst, as demonstrated by Matsui et al (T. Matsui, H. Kamatani, Y. Arimatsu, A. Kaji, K. Hattori, H. Suzuki Journal of Applied Polymer Science 1991, 42(9), 2443-2452). The majority of these reactions result in the formation of cyclic species wherein more than two chromophores can be involved and thus bound to each other, with subsequent formation of high cross-linked system, according to the reaction scheme:

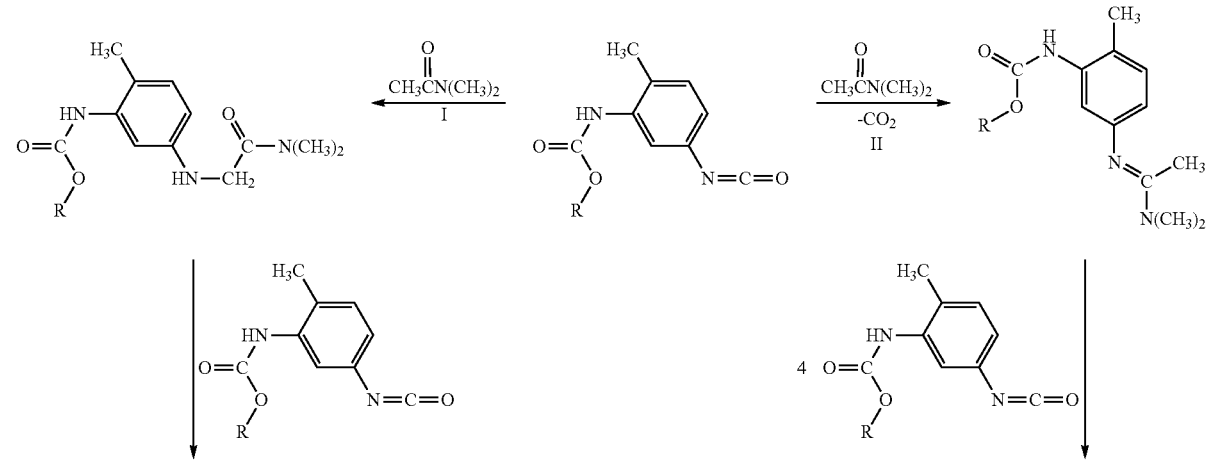

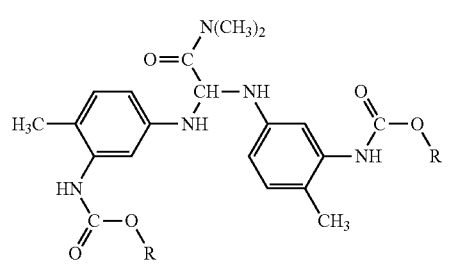
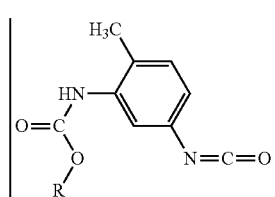
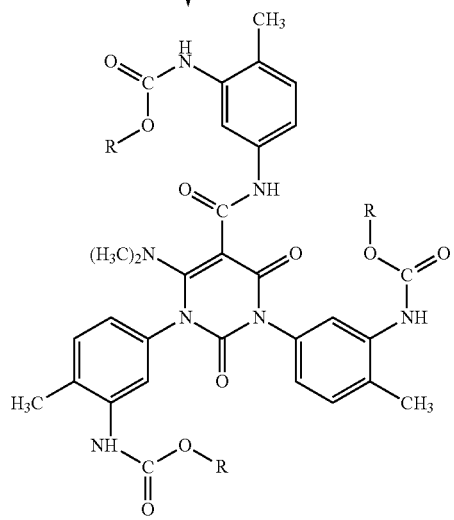
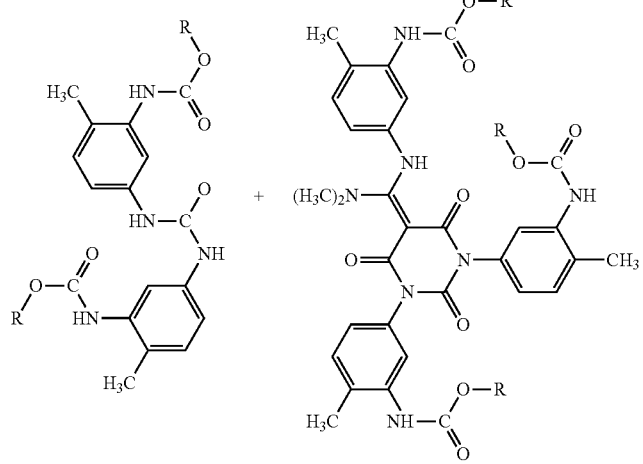
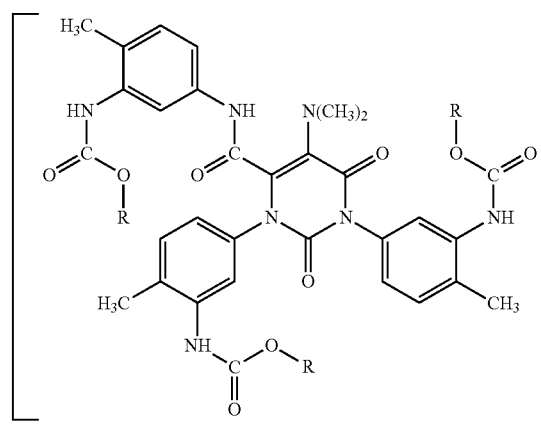

Poling Process

Second order NLO material response has been determined calculating the electro-optical coefficient $d_{33}$ of second order nonlinear optical susceptivity of $\chi^{(2)}$ on poled films.

This is the process step wherein it is necessary to determine an alignment preferential direction of the optically active member (chromophore). It is necessary to apply a polar strength field acting on chromophores so as to orient preferentially in a fixed direction and equi-oriented (poling). This field is typically an applied electric field, for example, creating on the polymer surface a charge layer in order that electric field values till 100 kV/mm to be generated (Faccini M, et al, J Mater Chem, 2008, 18, 2141-2149). The electric field values obtained in specific cases are strongly dependent on titled material properties. The charge layer is generated using Corona Poling technique taking advantage of ionization of the atmosphere around a tip or a thin wire charged at a potential on the order of kilovolts with respect to a flat electrode placed under the sample. In order to obtain an homogenous distribution of charge layer on the sample surface of approximately 5 cm², it has been used a device consisting of 8 thin copper tips (15 μm) obtained by nitric acid etching 1:4 circumferentially placed (diameter=4 mm), rotating (ν=4÷8 Hz), 4 cm apart from the counter-electrode, at a voltage between 7.5 and 11 kV in atmosphere with RH<15%. The poling room volume was approximately 64 liters. The polymer is heated at required temperature (160° C.) using an heating ramp of 60° C./min and then the poling voltage is applied. During first 20 min the residual solvent is evaporated and the voltage is limited at 7.5 kV; then it is increased up to 11 kV, i.e. threshold value before film localized damages are observed.

The temperature enhances molecule mobility and therefore the chromophore alignment, the higher temperature limit being the glass transition value $T_g$ in addition to the compound decomposition temperature. Thus the test has been carried out at 160° C. during up to two hours.

A 2 hour cross-linking time is sufficiently long for the completion of hardening process, as shown in FIG. 4, concerning the DSC time dependent curve, where the curve reaches a plateau after an exothermic peak resulting from cross-linking reaction.

Before the poling field release the sample is cooled (cooling ramp 2-4° C./sec under direct $N_2$ flow).

The films thus obtained have a bright mirror appearance, typically 500 nm thick. A roughness value obtained by ellipsometry is about 10 nm.

Realization of Optical Guides

The technology of polymeric films with electro-optical properties has been developed as an alternative to traditional inorganic electro-optical substrates like LiNbO$_3$, InP, or GaAs for realization of devices (phase/amplitude/frequency modulators, commutators, commutator matrices, etc) to be used in digital or analog optical transmissions/elaborations.

The replacement of inorganic substrates with organic materials can result in various advantages in terms of costs and performances. As to economic aspect an evolution similar to that already experienced in microelectronics field in the passage from the use of technologies based on inorganic substrates to plastic materials (so-called printed circuits) resulting in a dramatic investment and production cost decrease with obviously final lower global costs with same performances, is expected.

The use of these materials is closely dependent on the development of photolithographic and thin film processes in order to define, using above said films, optical paths with opportune size and shape in order to guide the optical radiation and define metallic conductive structures overlapped at level of optical paths, to be used like electrodes allowing to apply local electric fields for modulating, by material electro-optical properties, the phase and/or (in opportune configurations) the amplitude of optical signal.

Said technological development displays significant criticalities related to the need to define, through the use of thin film technologies involving particularly aggressive processes like ionic erosion or chemical etching, processes suitable to new organic materials in order to maintain unaltered optical and electrical characteristics thereof.

With reference to FIG. 3, for the realization of optical guides it has been therefore developed a process involving the coating of a protective buffer on the active material layer, before of photolithographic definition and ionic erosion steps. These successive steps will etch a film package wherein the active material is an embedded layer and therefore the process invasiveness will be decreased.

More particularly the process consists of the following steps:

coating, cross-linking, poling of the electro-optically active film according to above specified parameters;

coating of a protective buffer layer consisting of silicon dioxide or other dielectric material resistant to required chemical etchings for the definition of masking film according to the following step, coating of an etching mask with suitable pattern, preferably of metallic nature, resistant to subsequent ionic etching;

removal by ionic etching of protective buffer layer, only in etching mask free areas (outside of the optical path);

partial or total removal of electro-optically active film again outside of the optical path. All the optical path is constantly, i.e. during all the process, covered by the protective buffer.

As an illustrative reference of prior art, two possible processes are reported: the first, shown in FIG. 4, based on lift-off technology; the second, shown in FIG. 5, based on etching technology; both the processes are for a definition of a titanium strip and thermal diffusion thereof within the substrate, as it is required according to conventional approach when the optical guides for electro-optical modulators in LiNbO$_3$ inorganic crystals are to be defined.

According to lift-off technology photosensitive polymer is placed where titanium must not adhere. According to etching technology, the photosensitive polymer defines the zones where titanium must not be eroded.

The comparison with above said processes according to conventional technologies, wherein the substrate is constantly exposed to process typical chemical-physical erosion activity (in such case it is possible, being strong inorganic crystals), allows the technological development required in order to obtain above said compatibility to be proved.

The protective buffer, inserted in order to protect the active material, remains during the successive steps acting as screen layer over the guides, separating the same from metallic film successively deposited thereon in order the electro-optical driving electrodes to be realized.

FIG. 6 shows image obtained using electronic scanning microscope of an optical ridge guide obtained according to the process of the present invention.

Below, by an illustrative but non limitative way, some specific working examples of the present invention are reported.

EXAMPLE 1

2-Amino-5-nitrophenol diazonium salt (named (a)), starting from 15.0 g (97.3 mmol) of 2-amino-5-nitrophenol, suspended in 160 ml, of water and 53 ml of 37 wt % HCl, is prepared. The suspension has been cooled at 0-5° C., then under stirring 6.74 g (97.3 mmol) of NaNO$_2$ in 50 ml of water are added. After 2 hours diazonium salt is isolated by vacuum filtration.

Diazonium salt (a) is slowly added to a solution of 14.9 g (97.3 mmol) of 2,5-dimethoxy aniline in 200 mL of a solution containing: 20 ml of 37 wt % HCl, 40 ml of ethanol and 140 ml of water. After 1 hour under stirring, the mixture is poured in 500 mm of sodium acetate saturated aqueous solution. The product (b), green coloured, is isolated by filtration and re-crystallized from heptane:acetone 1:3.

Following results are obtained. Yield 77%. M.p.: 218° C. $^1$H-NMR (CHCl$_3$-d) δ (ppm): 3.92 (s, 3H); 3.95 (s, 3H); 4.68 (s, 2H); 6.32 (s, 1H); 7.78 (s, 1H); 7.85 (m, 3H); 13.86 (s, 1H). [Numbers rounded off to second decimal]

Then 5.00 g (15.8 mmol) of product (b) are grounded and suspended in 500 mL of water and 75 mL of 37 wt % HCl. To the suspension a solution containing 42.5 g (311 mmol) of ZnCl$_2$ and 18.2 g (311 mmol) of NaCl in 50 mL of water is added. The mixture is cooled at 0-5° C. Then under stirring 5.00 g (72.6 mmol) of NaNO$_2$ in 10 ml of water are added and the mixture is left to heat at room temperature. After 24 hours, a red product (diazonium salt) is recovered by filtration. Said product at room temp. is added to a solution containing 11.5 g (63.3 mmol) of N,N-diethanol aniline in 100 ml of DMF. After 12 hours under stirring, the solution is poured in 300 mL of sodium acetate saturated aqueous solution. The resulting product (c) is filtered, washed with water and re-crystallized from THF/hexane (50/50).

Following results are obtained. Yield: 71%. $^1$H-NMR (Py-d$_5$) δ (ppm): 3.90 (m, 10H); 4.09 (t, 4H, J=5.4 Hz); 7.04 (d, 2H, J=9.4 Hz); 7.74 (s, 2H); 7.85 (d, 1H, J=12.2 z); 8.08 (s, 1H); 8.09 (s, 1H, J=12.2 Hz); 8.22 (d, 2H, J=9.4 Hz).

Successively, 8.00 g (15.7 mmol) of product c are dissolved in 100 ml of DMF containing 5.00 g (36.2 mmol) of K$_2$CO$_3$. Then under stirring 9.81 g (78.5 mmol) of 2-bromoethanol are slowly added. After 72 hours, the solution is filtered and poured in 300 mL of sodium acetate saturated aqueous solution. The resulting product

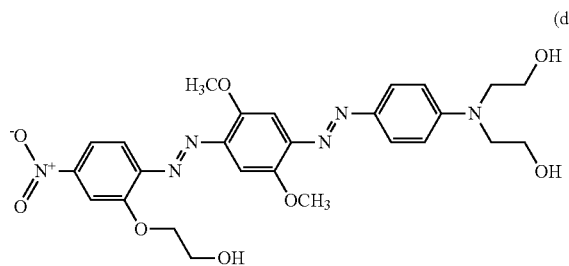

(d)

is filtered and purified by chromatography (Florisil 60/100, THF). Following results are obtained. Yield: 85%. $^1$H-NMR (DMSO-d$_6$) δ (ppm): 3.21 (t, 4H); 3.46 (t, 4H); 3.71 (t, 2H); 3.79 (s, 3H); 3.85 (s, 3H); 4.23 (t, 2H, J=4.5 Hz); 4.75 (s, 2H); 4.88 (s, 1H); 6.75 (d, 2H, J=8.7 Hz); 7.23 (s, 1H); 7.24 (s, 1H); 7.46 (d, 1H, J=8.7 Hz); 7.65 (d, 2H, J=8.7 Hz); 7.79 (d, 1H, J=8.7 Hz); 7.93 (s, 1H).

Successively, 0.500 g of product d are dissolved in 30 mL of anhydrous not stabilized THF containing 4 ml of distilled 2,4-tolylenediisocyanate. After 15-17 hours under stirring at room temp. the product (g)

lamino) ethanol in 200 mL of a solution containing 20 ml of 37 wt % HCl, 40 ml, of ethanol and 140 mL of water. After 1 hour under stirring, the mixture is poured in 500 mL of sodium acetate saturated aqueous solution. The obtained product (h) is isolated by filtration and re-crystallized from DMF and water.

$^1$H-NMR data for product h:

$^1$H-NMR (DMSO-d$_6$, 200 MHz) δ (ppm): 3.04 (s, 3H); 3.55 (m, 4H); 4.78 (s, 1H); 6.84 (d, 2H, J=9.2 Hz); 7.72 (m, 3H); 7.86 (d, 2H, J=9.2 Hz); 11.30 (s, 1H).

Successively, 5.00 g (15.8 mmol) of product h are dissolved in 100 ml of DMF containing 3.00 g of K$_2$CO$_3$. Then 6.58 g (52.6 mmol) of 2-bromoethanol are slowly added and the mixture is stirred at room temp. After 72 hours, the solution is filtered and poured in 300 ml of sodium acetate saturated aqueous solution. The obtained product

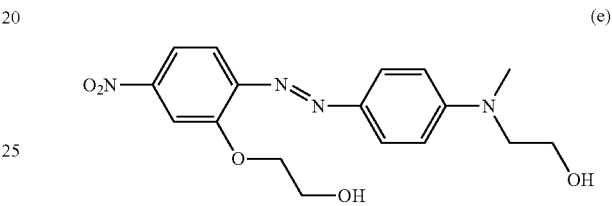

(e)

is filtered and purified by chromatography (silica, chloroform/acetone). Yield: 81%.

$^1$H-NMR data for product (e):

$^1$H-NMR (DMSO-d$_6$, 200 MHz) δ (ppm): 3.08 (s, 3H); 3.56 (m, 4H); 3.81 (t, 2H, J=4.8 Hz); 4.29 (t, 2H, J=4.8 Hz);

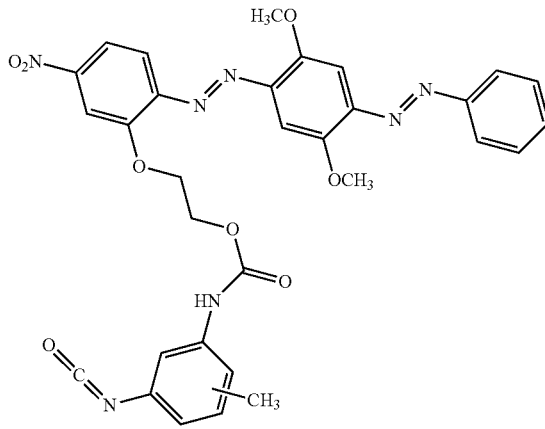

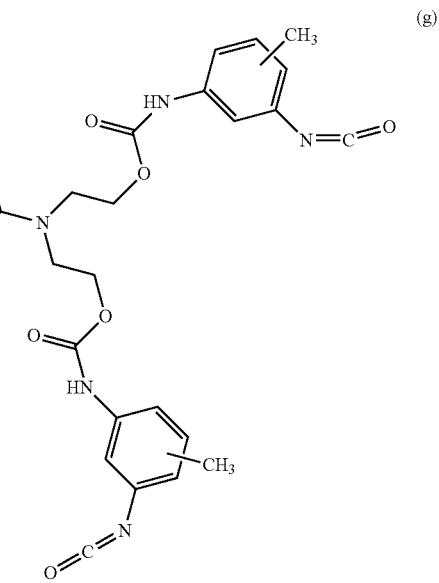

(g)

is precipitated in 200 mL of heptane, filtered and vacuum dried. Yield: 98%.

EXAMPLE 2

Diazonium salt from example 1 is slowly added to a solution containing 14.7 g (97.3 mmol) of 2-(methylpheny- 4.80 (t, 1H, J=5.4 Hz); 4.96 (t, 1H, J=5.4 Hz); 6.85 (d, 2H, J=8.8 Hz); 7.60 (d, 1H, J=8.8 Hz); 7.78 (d, 2H, J=8.8 Hz); 7.86 (dd, 1H, J1=8.8 Hz, J2=2.4 Hz); 7.97 (d, 1H, J=2.4 Hz).

Successively, 0.500 g of the product are dissolved in 20 ml of anhydrous not stabilized THF containing 2 mL of distilled 2,4-tolylenediisocyanate. After 15-17 hours under stirring at room temp., the solvent is removed and the product

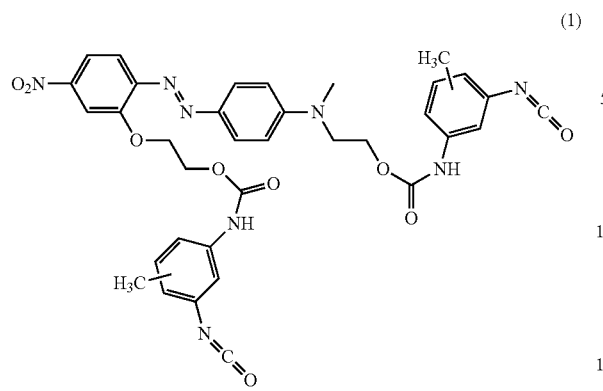

(1)

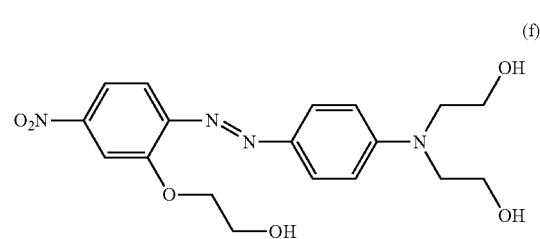 [SMILES: O=[N+]([O-])c1ccc(/N=N/c2ccc(N(CCO)CCO)cc2)c(OCCO)c1]

(f)

is precipitated in 200 mL of hexane, filtered and vacuum dried. Yield: 98%.

EXAMPLE 3

Diazonium salt a from example 1 is slowly added to a solution containing 17.6 g (97.3 mmol) of N-phenyl diethanol is filtered and purified by chromatography (Silica, chloroform/acetone). Yield: 77%.

$^1$H-NMR data for product f:

$^1$H-NMR (DMSO-$d_6$, 200 MHz) δ (ppm): 3.58 (m, 8H); 3.81 (t, 2H, J=4.8 Hz); 4.29 (t, 2H, J=4.8 Hz); 4.86 (t, 2H, J=5.4 Hz); 4.96 (t, 1H, J=5.4 Hz); 6.86 (d, 2H, J=9.2 Hz); 7.60 (d, 1H, J=8.8 Hz); 7.77 (d, 2H, J=9.2 Hz); 7.87 (dd, 1H, J1=8.8 Hz, J2=2.4 Hz); 7.97 (d, 1H, J=2.4 Hz).

0.500 g of the product f are dissolved in 20 mL of anhydrous not stabilized THF containing 3 mL of distilled 2,4-tolylenediisocyanate. After 15-17 hours under stirring at room temp., the solvent is removed and the

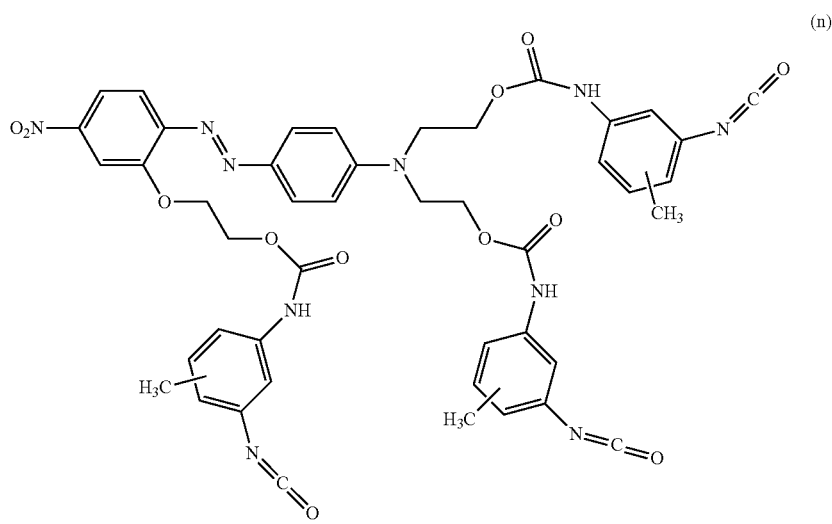

(n)

amine in 200 mL of a solution containing 20 ml of 37 wt % HCl, 40 mL of ethanol and 140 mL of water. After 1 hour under stirring, the mixture is poured in 500 ml of sodium acetate saturated aqueous solution. The obtained product (m) is isolated by filtration and re-crystallized from DMF and water.

$^1$H-NMR data for product m:

$^1$H-NMR (DMSO-$d_6$, 200 MHz) δ (ppm): 3.56 (m, 8H); 4.84 (s, 1H); 6.86 (d, 2H, J=9.0 Hz); 7.72 (m, 3H); 7.84 (d, 2H, J=9.0 Hz); 11.25 (s, 1H).

Successively, 5.00 g (14.4 mmol) of product m are dissolved in 100 mL of DMF containing 5.00 g of $K_2CO_3$. Then slowly 9.03 g (72.2 mmol) of 2-bromoethanol are added and the mixture is stirred at room temp. After 72 hours, the solution is filtered and poured in 300 mL of sodium acetate saturated aqueous solution. The product is precipitated in 200 mL of hexane, filtered and vacuum dried Yield: 98%.

EXAMPLE 4

In order to obtain a product with an increased thickness of approximately 1 μm, the amounts of reagents used in above examples are increased, according to below: DMNCO$_3$: 150 mg; THF: 1.1 ml; DMAC: 0.1 ml (2 drops).

A 1200 nm thick film on $SiO_2$ is obtained with good homogeneity, although the surface roughness is increased by 10 times (that, anyway, is a still acceptable value for guided optical applications).

The reproducibility of film thickness under these conditions is less reliable and a thickness variability±200 nm is observed on several samples.

EXAMPLE 5

SHG Measures

In addition THF solvent is replaced with dichloromethane having higher solubility activity, the amounts of components used in above examples are modified according to the following: $DMNCO_3$: 170 mg; $CH_2Cl_2$: 2 ml; DMAC: 0.05 ml (1 drop), stirring for 3' and then standing for 2', with coating using 0.21 µm pore size filter.

The result is the same both for coating and poling.

Other tests are carried out by replacing completely the solvent with DMAC (0.5 ml of DMAC for 130 mg of $DMNCO_3$). Also in this case the result is a good film forming activity and stable poling results (verification carried out for about ten day periods at 130° C.).

EXAMPLE 6

Measures of second harmonica generation are carried out a 1368 nm laser beam in order to be far from resonance conditions. The best values of nonlinear coefficient are $d_{33}=40\pm2$ pm/V on BK7 and 28 µm/V on $SiO_2$ (Si with 2 nm of native oxide). The first sample maintains unaltered SHG signal over nearly two years, while the second signal is unaltered since one year (RT at ambient light).

$d_{33}$ coefficient of poled films is determined by comparison of sample generated ($I_{2\omega}$) second harmonica and quartz x-cut 1 mm thick plate ($d_{11}=0.335$ µm/V) signals (I. Shoji, T. Kondo, R. Ito Opt. Quantum Electron. 2002, 34, 797-833). The second harmonica intensity oscillates as a function of the incidence angle. These oscillations were observed for the first time by Maker et al. and thus are known as Maker fringes (P. D. Maker, R. W. Terhune, M. Nisenoff, C. M. Savage, Phys. Rev. Letters 1962, 8, 21-22). FIG. 7 shows Maker fringes for $DMNCO_3$.

The data have been interpolated according to Herman and Hayden equation expressing second generated harmonica intensity (W. N. Herman, L. M. Hayden, J. Opt. Soc. Am. B 1995, 12(3), 416-427):

$$\frac{I_{2\omega}^{\gamma \to p}}{I_\omega^2} = K \cdot T^\gamma(\theta_\omega) \cdot d_{eff}^2 \cdot \Psi(\theta_\omega)$$

where $\omega\theta$ is incidence angle, K is apparatus calibration constant, $T^\gamma(\theta_\omega)$ is a function of incidence angle considering Fresnel coefficients and other factors depending on $\gamma$ polarization and $\psi(\omega\theta)$ is the factor generating Maker fringes depending on film thickness.

Being known sample thickness, refractive index at incident wavelength and second harmonica (obtained by spectral ellipsometry) and $d_{31}=d_{15}$ from Kleinmann symmetry (D. A. Kleinman Phys. Rev. 1962, 126, 1977) and $d_{31}=d_{33}/3$ relations (D. J. Williams, "Nonlinear optical properties of guest-host polymer structures", in Nonlinear Optical Properties of Organic Molecules and Crystals, D. S. Chemla and J. Zyss, eds. (Academic, Orlando, Fla., 1987), p. 405), $d_{33}$ component can be calculated using data obtained from an experiment of p→p type (polarized incident beam p polarized SHG signal p) being in this case:

$d_{eff}=2d_{15} \sin\theta_\omega \cos\theta_\omega \cos\theta_{2\omega}+d_{31} \cos^2\theta_\omega \sin\theta_{2\omega}+d_{33} \sin^2\theta_\omega \sin\theta_{2\omega}$ Best fit value of $d_{33}$ is 33.0 µm/V, analogous to $d_{33}$ coefficient for lithium niobate, one of reference materials for non-linear optics. A further experiment with a polarized incident beam s (s→p) allows $d_{31}$ component to be determined being in this case:

$d_{eff}=d_{31} \sin\theta_{2\omega}$

Best fit value is 10.8 µm/V, confirming that the imposed condition $d_{31}=d_{33}/3$ for p→p fitting represents a good approximation.

Not considering the nonlinear response value, this material has an excellent stability as to NLO properties over the time. FIG. 8 shows that, within experimental error, no activity loss during the heat treatment at a temperature of 130° C. of a poled sample is detectable.

This represents one of few examples wherein a NLO material NLO with high performances, both in terms of activity and still more stability, can be obtained with a very simple, fast and cheap process. Thanks to the co-existence of these advantageous characteristics, it is possible to consider this type of actually competitive approach for the production of organic material based NLO devices.

EXAMPLE 7

Absorbance and Refractive Index

FIGS. 9a and 9b show absorption spectra obtained from analysis carried out on 500 µm thick casting coated sample, FIG. 9b representing in detail 900 and 1600 nm range. It is possible to observe at 1500 nm that the sample absorption is ≤0.02 OD. This value represents an instrumental background value rather than the actual polymer absorption that can be estimated lower than 0.005 OD. As to the refractive index, ellipsometric determination gives a value of n (@684 nm)=1.86 and n (@1368 nm)=1.67.

FIGS. 10a and 10b show results of spectrophotometric absorption in visible range and ellipsometry determinations, respectively.

EXAMPLE 8

Loss Measure

Scattering loss determinations of cross-linked film from the compound d (thick 1300 nm) coated on $Si/SiO_2$ (8 µm) substrate are carried out by prism light coupling in the film, according to the scheme shown with reference to FIG. 12.

Guided modes of flat film are excited with infrared laser at 1550 nm wavelength and excitation related images (an example of which is shown in FIG. 13) are acquired using an infrared camera. Experimental excitation angles of guided modes for flat $DMNCO_3$ films prove to be in agreement with theoretical simulations obtained considering refractive index and ellipsometry determined thickness.

The loss value is obtained by optical image analysis, interpolating the profile of light intensity associated with excited mode in the film using an exponential function:

$$y = y_0 + A_1 \cdot e^{-(x-x_0)/t}$$

$$P = \frac{1}{t} \cdot (4.343) \left[\frac{db}{cm}\right]$$

thus obtaining the diagram shown in FIG. 13.

EXAMPLE 9

Image of the Film Guided Mode of the Film to Glide Down and Losses for Scattering The loss value of 7 dB/cm represents the average value of losses obtained by coupling laser light in various film points. In conclusion, in order to reduce the loss value of a flat film and therefore a potential channel guide, it is necessary to increase the thickness of initial film, in addition to further improve the film quality.

The present invention has been described by an illustrative but not limitative way according to preferred embodiments thereof but it is to be understood that variations and/or modifications can be carried out by those skilled in the art without departing from scope thereof as defined according to enclosed claims.

The invention claimed is:

1. A process for the realization of polymeric materials with second order nonlinear electro-optical properties comprising the following steps:
    mixing a solution consisting of a chromophore with nonlinear optical properties and two or three hydroxy groups, a non-reactive solvent and an isocyanate compound with at least two isocyanate groups to form one or more bi- or tri-isocyanate NLO chromophores;
    isolation of said pure or bi- or tri-isocyanate NLO chromophores;
    dissolution of said bi- or tri-isocyanate NLO chromophores in a non-reactive solvent containing isocyanate reactive compounds consisting of acrylformamide, formamide and/or acylamides having as N substitutents, groups which are not reactive with isocyanate selected from hydrogen, alkyl, substituted alkyl, phenyl and substituted phenyl groups, in order to obtain a prepolymer mixture comprising said non-reactive solvents, said NLO bi- and tri-isocyanate chromophores, said isocyanate reactive compounds and reaction products of said NLO bi- and tri-isocyanate chromophores and said isocyanate reactive compounds;
    coating of a thin layer of said prepolymer mixture on a substrate and evaporation of said non-reactive solvents;
    cross-linking and poling of said thin layer on substrate, by means of heating and application of an electric field, in order a cross-linked and poled thin layer to be obtained;
    cooling of said thin cross-linked, and poled layer at ambient temperature maintaining the applied poling electric field;
    switching off the poling electric field.

2. The process the realization of polymeric materials with second order non linear electro-optical properties according to claim 1, wherein said cross-linking and poling step of thin layer coated on the substrate comprises of: pre-heating of a thin layer coated on the substrate at a temperature from 100 to 180° C. over a time up to minutes and subsequent application of an electrode voltage from 3 to 20 kV for at least one hour.

3. The process for the realization of polymeric materials with second order non linear electro-optical properties according to claim 2, wherein said pre-heating carried out at a temperature from 160 to 180° C., with an heating ramp of 50-80° C./min, and said voltage is from 7.5 to 11 kV for times up to two hours.

4. The process for the realization of polymeric materials with second order non linear electro-optical properties according to claim 1, wherein said isocyanate reactive compound consists of N,N-dimethylacetamide (DMAC).

5. The process for the production of polymeric materials with second order non linear electro-optical properties according to claim 1, wherein said coating step of said prepolymer mixture on said substrate is performed by spin coating.

6. The process for the production of polymeric materials with second order non linear electro-optical properties second according to claim 1, wherein said cooling step of crosslinked and poled thin layer at room temperature maintaining the applied poling electric field occurs with a cooling ramp of 2-4° C./sec under direct $N_2$ flow.

7. The process for the realization of an electro-optical device by definition of optical paths and driving electrodes in a polymeric material with second order nonlinear properties, characterized in that it comprises, following the steps of realization of said polymeric material with second order nonlinear electro-optical properties according to claim 1, a step set of photolithographic definition and ion etching of said polymeric material, after a step for coating of a protecting buffer layer on said polymeric material so as to maintain constantly embedded said thin layer of said polymeric material in the areas defining the optical paths during all the successive photolithographic definition and ionic etching steps.

8. The process for the realization of an electro-optical device according to claim 7, comprising the following steps:
    coating of a protective buffer layer consisting of silicon dioxide or other dielectric material resistant to required chemical etching for the definition of an etch mask;
    coating of said etch mask with suitable pattern, resistant to ion etching;
    removal by ion etching of said protective buffer layer, only in etch mask free areas;
    partial or total removal of said thin layer of said polymeric materiel with second order nonlinear electro-optical properties by chemical etching of the etch mask free areas.

* * * * *